May 27, 1969
V. C. P. MORFOPOULOS
3,447,049
USE OF INHOMOGENEOUS ELECTRICAL FIELDS IN PROCESSES
INFLUENCED BY ELECTRICAL FIELDS
Filed May 5, 1965
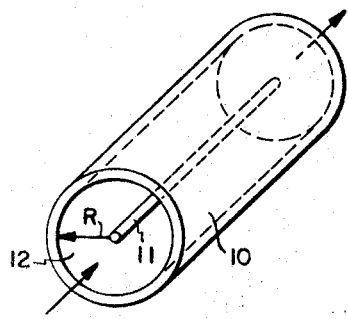
FIG. 1
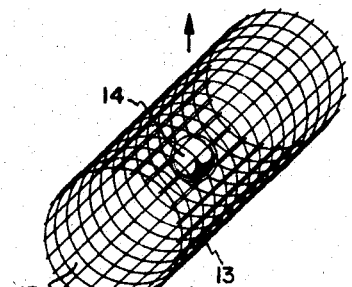
FIG. 2
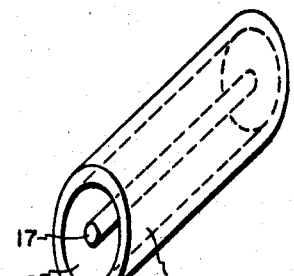
FIG. 3
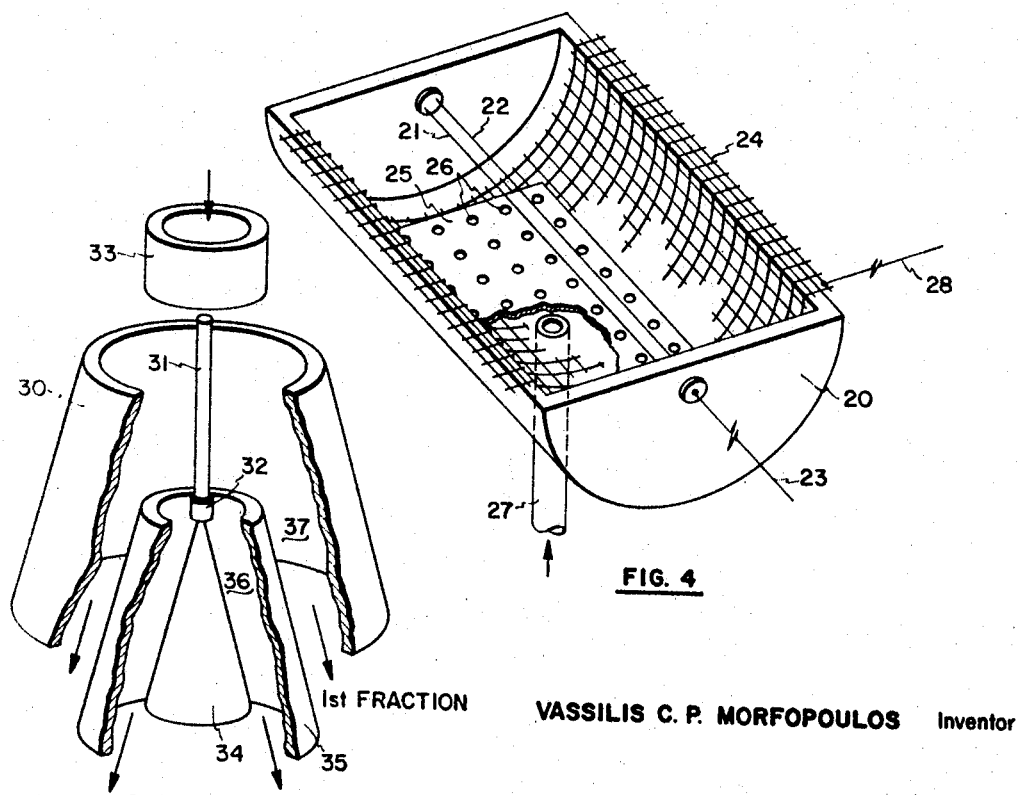
FIG. 4
FIG. 5
VASSILIS C. P. MORFOPOULOS   Inventor

United States Patent Office 3,447,049
Patented May 27, 1969

3,447,049
USE OF INHOMOGENEOUS ELECTRICAL FIELDS IN PROCESSES INFLUENCED BY ELECTRICAL FIELDS
Vassilis C. P. Morfopoulos, 233 E. 70th St., New York, N.Y. 10021
Filed May 5, 1965, Ser. No. 453,332
Int. Cl. H01g 3/02
U.S. Cl. 317—262        3 Claims

ABSTRACT OF THE DISCLOSURE

Electrical and/or electrochemical mechanisms, such as movement of charge on particle surfaces or charge interactions of matter are enhanced by the use of inhomogeneous electrical fields having strong electrical gradients as location in the field is changed relative to the position between the electrodes.

---

The present invention deals with a method of improving processes involving electrical and/or electrochemical mechanisms, phenomena, processes, and treatments susceptible to the influences of electrical fields. More particularly, the present invention resides in the use of inhomogeneous electrical fields to effect improvement in such processes.

Various systems involve electrical or electrochemical mechanisms which can be influenced by the use of electrical fields. In general, these processes involve movement of charge on surfaces of particles or in the bulk or charge interactions of matter and consequently may be influenced by the use of electrical fields. Examples of such phenomena and methods, with respect to all of which the present invention finds application, are: acceleration, concentration, desegregation, diffusion, dissolution, electrification, electrolysis, levitation, polarization, segregation, separation (electrical), solidification, thermal emission, vapor deposition, vapo-metallurgical treatments (examples are degassing, differential vaporization, levitation, etc.), and the like. Heretofore, when electrical fields were utilized with respect to these processes, the fields were characterized by various degrees of symmetry approaching electrical field homogeneity, as for example, fields created by parallel electrode plates. In other instances application of electrical methods has not been possible because of limitations of the prior art systems.

It has been discovered that considerable advantages are obtained with respect to the foregoing processes by subjecting them to the influence of an inhomogeneous electrical field, i.e. an electrical field exhibiting strong electrical gradients as location in the field is changed relative to the position between the electrodes. Such electrical fields are formed by co-centric positioning of electrodes with electrode surfaces having a curvilinear geometry. Examples of electrode configurations which result in inhomogeneous electrical fields with strong gradients are: cylinders within cylinders, wires within cylinders or ovular members, spheres within cylinders, cone within a cone, ovular electrodes within ovular electrode configurations, spheres within spheres or ovals, etc. A configuration of a relatively small diameter inside electrode cylinder, e.g. rod within an ovular cylindrical member surrounding the rod and at a distance therefrom is particularly advantageous for the establishment of strong gradients. The two or more co-centric electrodes may be separated by any dielectric medium, i.e. solid, liquid or gas. Typical examples of dielectrical media are: air, various gases, partial or complete vacuum, dielectric liquids or solutions, molten elements or compounds, dielectric solids, and any combination thereof.

The present advantageous effects of employing an inhomogeneous electrical field are particularly pronounced when a substantial voltage difference is impressed across the electrodes. In general the electrodes are maintained at a 50 fold difference in voltage (considering the lower voltage electrode to be assigned a minimum voltage of 1). A typical example might employ an inner electrode of 20,000 to 40,000 volts with the outer electrode having a small negative potential of perhaps 0 to 200 volts.

It is to be noted that the present inhomogeneous electrical fields exhibit relatively large variations in electrical gradient as the relative position is changed between the two co-centric electrodes. Thus it is clearly distinguished from the substantially homogeneous fields created by the use of straight-faced electrodes and the like.

The inhomogeneous electrical fields advocated are effected in general by the use of direct current mechanisms.

The inhomogeneous electrical field methods of the present invention enhance the rate and effectiveness of the above referred electrical and electro-chemical processes by virtue of their increasing the effectiveness of charging particles and/or increasing the dielectric constant of the particles and increasing the matter-field interactions effecting the influence of dielectric forces on the particles subject to inhomogeneous fields. (These dielectrical forces not being observed in homogeneous fields.) By increasing the charges imparted to the particles as well as the dielectric constant and influence of dielectric forces, the effectiveness and rate of the processes such as acceleration, charging, concentration, diffusion, electrolysis, etc. are improved.

Particularly advantageous methods of employing the present invention are in the charging of particles such as for example fibers to be impregnated on surfaces, and the like. A greater charge is imparted to the particles by virtue of the homogeneous electrical field through which they are circulated, thereby increasing the effectiveness of the impregnating process. Also of particular interest is the use of an inhomogeneous electrical field in the concentration of mineral particles and the like. Thus aggregates of dielectric suspensions such as minerals and the like may be passed through the influence of the inhomogeneous electrical field and the rate and quality of separation of mineral particles thereby enhanced.

It should be noted that in general the inhomogeneous electrical fields employed are predominantly static in nature and whenever movement of electrical entities is encountered, as for example diffusion, electrification, etc. or matter-to-field interactions are experienced as for example levitation, polarization, etc., neither high energies or high velocities are attained, thus further distinguishing the present invention from mechanisms used in atomic particle physics. The present inhomogeneous fields offer particular promise in the electrification of microscopic particles, such as mineral particles, fibers, dust, paint droplets, aerosols, and the like. Likewise, in the application of dielectric forces or interactions on mineral particles, fibers, dust, paint droplets, aerosols and any piece of matter submerged in a dielectric medium in general.

The various aspects and modifications of the present invention will be made more clearly apparent by reference to the following description, drawings and accompanying examples.

FIG. 1 illustrates the use of co-centrically placed cylindrical electrodes for forming inhomogeneous electrical fields;

FIG. 2 depicts the use of a spherical electrode positioned within a cylindrical electrode;

FIG. 3 illustrates the use of an oval-shaped electrical member to effect the necessary configuration for forming an inhomogeneous electrical field;

FIG. 4 illustrates a system particularly suitable for charging particles for spraying onto a surface;

FIG. 5 depicts an illustrative system wherein the present invention is utilized for the concentration of minerals.

Referring to the drawings, FIG. 1 depicts a particularly suitable system for forming an inhomogeneous electrical field, characterized by the placement of a wire, rod or other generally small diameter cylindrical electrode 11, co-centrically within an outer electrode 10 of a larger diameter. Both electrodes are connected to sources of electrical potential by means not shown. Electrodes 10 and 11 are separated by dielectric medium 12 which may be conveniently air or other gas, liquid, or solid medium carrying the macro or micro particles to be subjected to the influence of the electrical field. A relatively small voltage of the order of 0 to 300 volts may be impressed on electrode 10 while wire electrode 11 may be carrying a very substantially greater voltage, e.g. 1,000 or more volts. At any point on line R representing the distance between the inner cylindrical electrode and the outer cylindrical electrode there will be a substantial electrical gradient in either direction as one moves along line R changing relative position to the electrodes. In other words, an inhomogeneous electrical field exists. Material to be subjected to the influence of the inhomogeneous electrical field may be passed through the space between the electrodes 10 and 11 along the axis of the electrodes or perpendicular thereto.

FIG. 2 depicts an alternate co-centric cylindrical configuration of electrodes, which produces a non-homogeneous electrical field. As shown in FIG. 2, a spherical electrode 14 is placed within a generally cylindrical electrode 13 which may take the form of a solid cylinder, a wire mesh, or the like. Electrodes are separated by dielectric medium 15 and connected by means not shown to sources of electromotive force. Micro or macro particles to be subjected to the influence of the inhomogeneous field created by electrodes 13 and 14 may be passed through the wire mesh electrode 13 or be displaced with respect to either 13 or 14 in the space contained therein moving about spherical electrode 14 as they pass out of the configuration.

FIG. 3 illustrates an alternative system wherein an electrode of generally ovular shape 16 is employed in conjunction with electrode 17 which may be cylindrical or similarly ovular in characteristic geometry. As described relative to FIGS. 1 and 2, dielectric medium 18 may be gas, liquid or solid. A solid can be used to treat the solid itself to charge its electrical properties or to treat a particle held by the solid, such as a particle within a plastic. In such applications, any non-conducting or semi-conducting solid is a dielectric and can be used to effect such processes as polarization, diffusion, solidification, segregation, desegregation, etc.

FIG. 4 depicts a specific embodiment whereby fibers or the like may be charged by use of the present invention, the fibers thereafter being sprayed onto a receiving surface or the like. In this aspect of the present invention, the inhomogeneous electrical fields within the applicator casing 20 serve as an improved particle fiber charger and applicator.

The material of construction for the casing 20 of the applicator is a strong insulator. Examples of suitable materials include non-conductive plastics, such as Lucite, polyolefins, and the like, all of which are well known in the art. The non-homogeneous electrical field is created within the casing and is established between one or a plurality of thin wire electrodes 21 and 22 and a conducting partial cylinder 24 made of wire mesh, e.g. copper, steel, or aluminum, etc., connected to voltage sources not shown by elements 23 and 28, respectively. Wire mesh semi-cylindrical electrode 24 is maintained at a small negative potential of the order of 0 to 200 volts, while electrical wires 21 and 22 are maintained at a voltage of 20,000 to 40,000 volts. The particles to be charged can be either charged in a batch or continuous fashion. However, it is preferable to subject the particle fibers, natural or synthetic, such as nylon or cellulosic fibers, to a continuous process for charging by passing the fibers suspended in an air stream which passes through inlet passage 27 whereupon the fibers are distributed across the internal breadth of the applicator by means of dispersing grid 25 containing apertures 26 through which the air-fiber stream passes. The uncharged or slightly charged fiber particles do not cling to the slightly negative electrode wire mesh 24 and are lifted by controlled air stream so that they are evenly dispersed through distributor grid 25. As the discrete fibers approach the discharging high potential electrode, they acquire efficiently the maximum negative charge and proceed past the electrode wires 21 and 22, further repelled by these high voltage negative electrodes. The fibers are thus propelled in a direction perpendicular to wire electrodes 21 and 22 and are discharged from the charging device unto the surface to which they are to be applied.

In a typical use of the present invention the fibers may be charged for imbedding onto a wall or other surface which has been coated with an adhesive. Thus, the particles are discharged as electrically charged particles from the applicator and imbedded in the nearby adhesive coated surface, such as a wall or the like. A strip element of a conductor, such as an aluminum foil or the like, can be employed to ground the surface on which they are imbedded, so as to deplete the surface from undesirable negative charges, thus facilitating the approach of the fibers which have been negatively charged in accordance with the present invention's use of an inhomogeneous field.

The system outlined in FIG. 4 offers numerous advantages for conventional particle charging techniques which have been utilized for imbedding particles onto surfaces and the like. The fibers need not be treated to become conductive and are evenly charged and separate with ease. The ease of separation of the fibers is effected by the combined effects of the air stream, the slightly negative potential of the cylindrical electrode, and the relatively low initial charge. Due to the use of the inhomogeneous electrical fields, the fibers are efficiently charged.

If desired, an adjustable head can be attached to the applicator casing so as to make the application of fibers directional or otherwise restricted as far as the shape of the outgoing stream of fibers is concerned.

FIG. 5 depicts a system particularly suitable for the concentration of particles, as for example to be employed in mineral concentration and/or separation systems.

Shown in FIG. 5 is a configuration for forming an inhomogeneous field by the placement of a rod electrode 31 within an outer generally cone shaped electrode 30, the electrodes being maintained respectively at 10,000 to 30,000 volts and 0 volts. The electrodes may be copper, brass or aluminum, or the like. A stream of mineral particles suspend in air or a liquid such as water, passes through the system under free fall conditions, the particles being introduced through inlet head 33 which distributes the particles across the space between the electrodes. The curtain of particles which may be, for example, quartz or cassiterite powders of 1 to 3 millimeters in size, passes through the inhomogeneous electrical field between electrodes 30 and 31 and are thereby subject to dielectric forces which exert differing degrees of reaction depending on the nature of the particles.

Co-centrically positioned splitters 34 (conveniently depending on rod 31 and fixed thereby by insulator 32) and 35 are placed towards the lower portion of the inhomogeneous field so as to form channels 36 and 37 thereby segregating particle fractions according to particle response to the dielectric forces and thus according to particle characteristics. In this illustrative example, the particles may have a residence time of 0.5 to 1.5 seconds in the field. Residence time can be varied with length of the field area and/or alterations of particle velocity such as by air flowing against the free-fall of the particles.

The conditions to be employed can of course vary widely. Size of the particles may be varied to suit particular predetermined conditions of electrical gradient and potential at a given location, (thereby determining dielectric forces) or vice versa.

Further ways of employing the present invention in the treatment of minerals include:

(1) Efficient and fast charging by an inhomogeneous field arrangement; this can be used in conventional or new mineral concentration systems.

(2) Concentration and/or separation according to dielectric constants (see Example II).

(3) Changing dielectric permittivities of minerals by exposing the strong inhomogeneous fields. Then concentrate according to "improved" dielectric constants.

(4) Combine any or all of the above with conventional or new techniques used in mineral concentration.

EXAMPLE I

The following experimental data illustrates the operation and effect of inhomogeneous electrical fields.

Table I illustrates the location values for the electrical field intensity within a cylindrical field as a function of applied potential. In the experiment utilized an outer to inside electrical radii ratio of 6 to 1 was employed with the inner electrode being kept at ground potential. The electrodes were made of brass.

TABLE I.—FIELD INTENSITY CHARACTERISTICS OF A TYPICAL CYLINDRICAL FIELD*

| Distance from negative electrode (cm.) | Field strength (kv./cm.) | | | | | |
|---|---|---|---|---|---|---|
| | 1 | 2 | 3 | 4 | 5 | 6 |
| Applied negative voltage (kv.): | | | | | | |
| 5 | 2.0 | 1.0 | 0.7 | 0.5 | 0.4 | 0.25 |
| 10 | 4.0 | 2.0 | 1.3 | 1.0 | 0.8 | 0.6 |
| 15 | 6.0 | 3.0 | 2.0 | 1.5 | 1.2 | 1.0 |
| 20 | 8.0 | 4.0 | 2.6 | 2.0 | 1.6 | 1.3 |
| 25 | 10.0 | 5.0 | 3.3 | 2.5 | 2.0 | 1.7 |
| 30 | 12.0 | 6.0 | 4.0 | 3.0 | 2.4 | 2.0 |

*With a 6=1 outer-to-inside electrode radii ratio.

As shown in the experimental results, as the distance from the negative electrode increases the field gradient at a given value of applied potential decreases, a very substantial change in electrical field strength taking place over a relatively small distance.

EXAMPLE II

In a series of experiments, the ability of an inhomogeneous electrical field to impose a dielectric force on various particles was established; such dielectric forces being functions of the field strength and field gradient and observed only in the described inhomogeneous electrical fields.

In these experiments various samples having dimensions of about 0.25 cm.$^2$ by 0.50 cm. (area perpendicular to field lines by particle length), were placed between a concentrical electrode configuration, such as shown in FIG. 1, the samples being placed at a distance of about 3 cm. (one half way) between the inner electrode and the outer electrode which were separated by a distance of about 6 cm. The inner electrode was maintained at a voltage of 5,000 or 10,000 volts and the outer electrode at a voltage of 0 volts. Table II illustrates some typical dielectric force values measured on semi-conductive and dielectric particles suspended in the inhomogeneous electrical field thus created and illustrates the dielectric forces thus created. Dielectric forces (any forces for that matter) can be used in a separation on concentration system, for instance to separate or concentrate minerals.

TABLE II.—TYPICAL DIELECTRIC FORCES EXPERIENCE BY PARTICLES IN INHOMOGENEOUS FIELDS

| Sample | Published dielectric constant a | Measured dielectric constant b | Dielectric force c (dynes/A$^2$) at field of— | |
|---|---|---|---|---|
| | | | 5 kv. | 10 kv. |
| Quartz | 4.7 | 4.7 | d 0.73 (0.5)  2.12 (0.8) | 2.85 (0.9)  8.07 (1.6) |
| Cassiterite | 23.2 | 24.4 | 4.91 (0.5)  14.93 (0.9) | 8.50 (1.0) |
| Paraffin | 2.2 | 1.9 | 0.15 (0.4) | 0.54 (0.9) |
| Paraffin-coated quartz | | 2.8 | 0.32 (0.5) | 0.87 (0.9) |
| Teflon | 2.0 | 2.1 | 2.46 (1.8) | 9.90 (3.6) |
| Opalwax | 13.2 | 12.7 | 4.11 (0.6) | 15.13 (1.2) |
| Apiezon-W | 2.8 | 2.9 | 1.39 (0.9) | 5.84 (1.8) | a Dielectric constant values, indicative of dielectric permittivity, have been cited in the literature for low alternating-current fields.
b Dielectric constants measured from interactions with cylindrical field.
c Dielectric forces are functions of the field strength and field gradient and are observed only in described inhomogeneous fields.
d Number in parentheses denotes the value of the field gradient in kv. corresponding to the force shown.

EXAMPLE III

A series of experiments were run to determine the maximum time effect on dielectric constant obtainable by subjecting various particles to an inhomogeneous field.

In this experiment, the term "No treatment" designates response to the inhomogeneous field at time zero. Then the particles were left in the field with potential and gradient "on." These "treated" the particles increasing their dielectric constants (dielectric response) to a maximum degree obtained of saturation (i.e. after some time).

The data in Table III show examples of the effect of the electrical treatment on solid dielectrics. By increasing the dielectric susceptibility of matter, the interaction of the matter with the electrical fields is enhanced, thereby improving the operations of the processes to which the present invention is directed. The exposure of the dielectric pieces of matter to strong electrical fields thereby produces additional polarization of the matter, above and beyond its inherent polarization by virtue of orientation of dipoles, vacancies, impurities and the like, thereby making the matter under treatment more dielectrically permeable and more responsive to electrical interactions. This treatment would also be instrumental in cases like space probes where selective and by choice changes in dielectric permittivity of materials is desirable.

TABLE III.—DATA ON THE INCREASE OF DIELECTRIC CONSTANT BY TREATMENT IN INHOMOGENEOUS FIELD*

| Sample | No treatment | | | Saturation | | |
|---|---|---|---|---|---|---|
| | Measured dielectric constant | Dielectric force a at field of— | | Measured dielectric constant | Dielectric force at field of— | |
| | | 5 kv. | 10 kv. | | 5 kv. | 10 kv. |
| Quartz | 4.7 | 0.73 (0.5) | 2.85 (0.9) | 25.9 | 4.83 (0.5) | 9.85 (0.9) |
| Paraffin | 1.9 | 0.15 (0.4) | 0.54 (0.9) | 1.9 | 0.15 (0.4) | 0.52 (0.9) |
| Quatz-in paraffin | 4.2 | 0.51 (0.4) | | 20.8 | 3.15 (0.4) | 6.45 (0.9) |
| Teflon | 2.1 | 2.46 (1.8) | 9.90 (3.6) | 2.1 | 2.46 (1.8) | |
| Cassiterite | 24.4 | 4.91 (0.5) | 8.50 (1.0) | 44.8 | 9.21 (0.5) | | a Numbers and units have the same meaning as in Table II.
*There is no comparable effect in homogeneous field treatment.

EXAMPLE IV

Table IV illustrates the increased effectiveness of imparting electrical charges to particles by the use of the present invention in contrast to placing the particles under the influence of a homogeneous field.

The experimental procedure was as follows:

Electrodes—brass outer cylinder and inside rod as in FIG. 1.
Voltages—shown in column 2 in Table IV.
Position—half way between electrodes.

Particles were suspended for times shown and were electrified by discharge electrification at voltages shown. All experimental conditions were kept identical for both homogeneous and inhomogeneous fields used. Both rate of charging and amount is shown superior by use of inhomogeneous arrangement.

TABLE IV.—ELECTRIFICATION EFFICIENCY OF INHOMOGENEOUS VS. HOMOGENEOUS FIELDS

| Sample [a] | Applied Potential, kv. | Duration of Electrification, min. | Percent RH Relative Humidity | Surface charge, stat coulombs/cm.[3] | |
|---|---|---|---|---|---|
| | | | | Homogeneous field | Inhomogeneous field |
| Quartz | 20 | 15 | 30 | 0.75 | 1.70 |
| | 25 | 1 | 10 | 0.05 | 1.34 |
| | 25 | 1 | 20 | 0.11 | 1.37 |
| | 25 | 1 | 30 | 0.60 | 1.44 |
| | | Saturation | 0–30 | 1.07 | 1.72 |
| Cassiterite | 25 | 1 | 20 | 0.71 | 2.48 |
| | | Saturation | 20 | 1.11 | 2.68 |

[a] At time=0, the sample was completely uncharged.

As shown in Table IV, the use of an inhomogeneous electrical field very substantially increases the surface charge and rate of charging of the particles as compared with the use of homogeneous fields.

In a similar experiment nylon fibers were introduced into a cylindrical inhomogeneous field and the superior action of the latter over similar homogeneous fields was attested to by visual observation of the fiber travel away from the negative electrode upon charging. Efficient charging of the fibers in a relatively weak inhomogeneous field (20–30 kv.) resulted in a pronounced repulsion of the fibers by the field, a phenomenon which does not occur when homogeneous fields were utilized. This further indicates the effective charging of the particles by virtue of passing them through an inhomogeneous field.

By way of summary, the present invention wherein inhomogeneous fields are employed in various phenomena involving movement or charge interactions of matter on surfaces which are beneficially affected by the use of electrical fields offer important advantages. Dielectric forces of significant magnitude are experienced by the particles in the strongly inhomogeneous fields and the resulting forces therefrom can be utilized to effect movement of microscopic or macroscopic particles within the field. Further, the exposure of dielectric particles to strong inhomogeneous electrical fields results in polarization of the former, causing significant increases in their dielectric constants. This results in proportional increases in the effect of the dielectric forces and/or electrical interactions. The rate and efficiency of electrification and other phenomena in inhomogeneous fields is decidedly superior to the corresponding properties in homogeneous fields. Further, charged particle movements and discharge conditions in inhomogeneous fields are superior to those in the corresponding homogeneous fields, the former being proportional to field gradients.

Having described the present invention that which is sought to be protected is set forth in the following claims.

What is claimed is:

1. An improved process for charging fibrous particles which comprises passing said fibers through an inhomogeneous electrical field formed by co-centrically positioned electrodes of curvilinear geometry, the inner of said co-centrically positioned electrodes being at a voltage at least 50 times the voltage of the outer electrode (assigning the latter a minimum voltage of 1).

2. The process of claim 1 wherein the outer electrode is in the form of a curved wire grid, and said fibers are passed through the inhomogeneous electrical field between said electrodes while suspended in an air stream.

3. The process of claim 2 wherein said inner electrode is a wire having a voltage of 20,000 to 40,000 volts, and the outer wire grid electrode has a voltage of 0 to 200 volts.

References Cited

UNITED STATES PATENTS

| | | | |
|---|---|---|---|
| 1,822,074 | 9/1931 | Winchester | 317—3 X |
| 1,854,475 | 4/1932 | Littlefield. | |
| 2,114,682 | 4/1938 | Gumaer | 317—3 X |
| 2,364,641 | 12/1944 | Meston | 317—3 X |
| 2,659,841 | 9/1953 | Hampe | 317—3 |
| 3,292,044 | 12/1966 | Klahr | 317—3 |

JOHN F. COUCH, *Primary Examiner.*

J. D. TRAMMELL, *Assistant Examiner.*